March 7, 1933.  K. A. KILBOURNE  1,900,717
CYANIDE APPLICATOR
Filed July 7, 1925  3 Sheets-Sheet 1

KENNETH A. KILBOURNE.
INVENTOR.

BY [signature]
ATTORNEY.

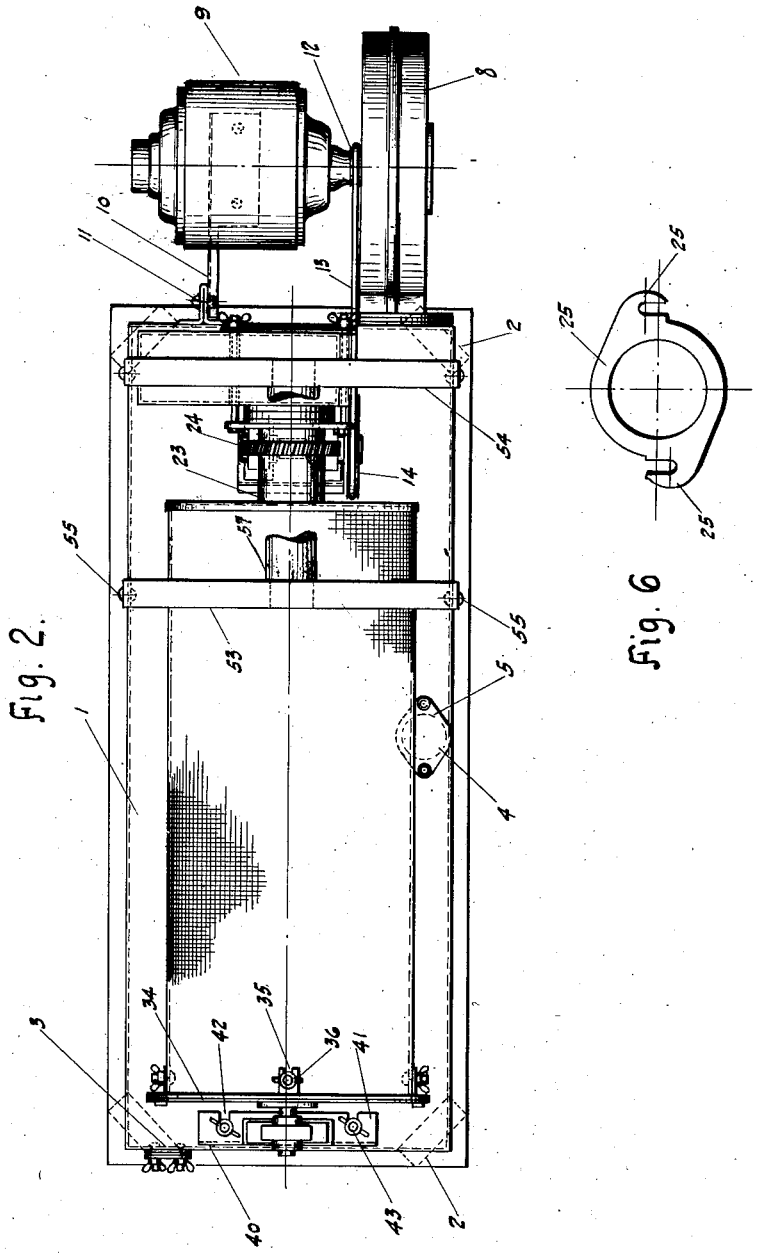

March 7, 1933.  K. A. KILBOURNE  1,900,717
CYANIDE APPLICATOR
Filed July 7, 1925   3 Sheets-Sheet 3
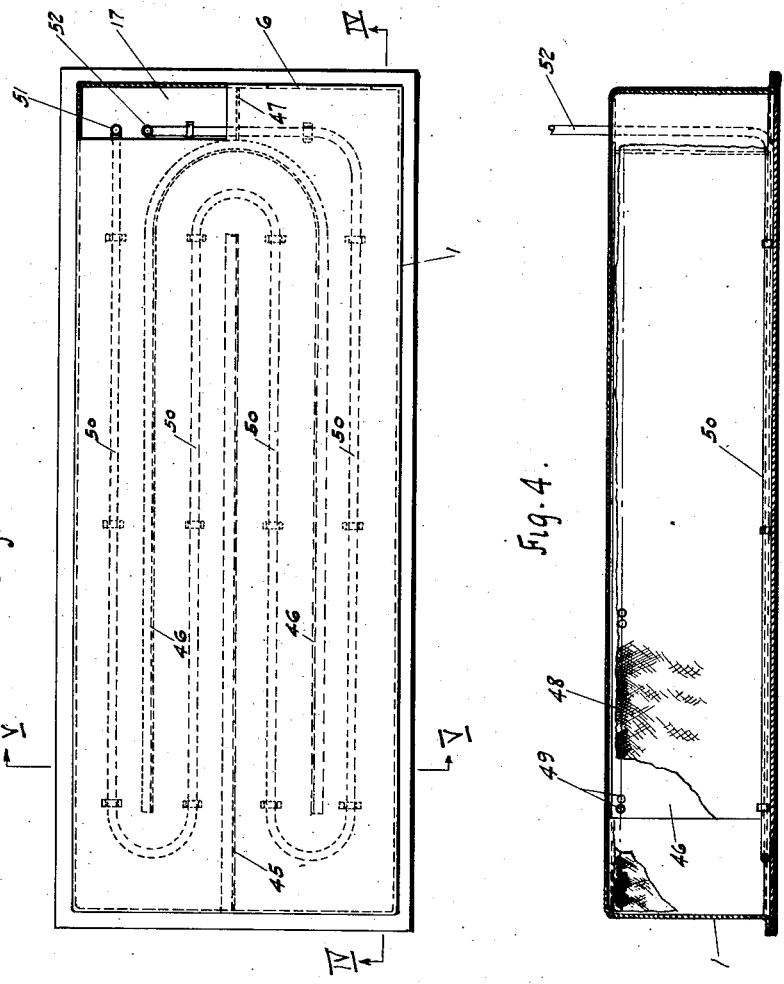
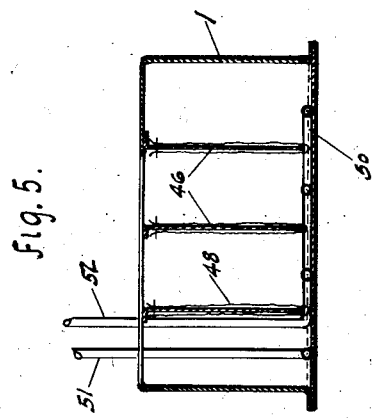
KENNETH A. KILBOURNE.
INVENTOR.
BY
ATTORNEY.

Patented Mar. 7, 1933

1,900,717

UNITED STATES PATENT OFFICE

KENNETH A. KILBOURNE, OF ELIZABETH, NEW JERSEY, ASSIGNOR TO AMERICAN CYANAMID COMPANY, OF NEW YORK, N. Y., A CORPORATION OF MAINE

CYANIDE APPLICATOR

Application filed July 7, 1925. Serial No. 41,925.

This invention relates to fumigating applicators, more particularly to an apparatus adapted to release a toxic gas from solid material.

Recently there has been placed on the market a material which is known as "Cyanogas", consisting probably of calcium cyanide mixed with other substances. An analysis thereof would indicate that it contains a large proportion of the cyanids and chlorids of calcium and sodium, together with small quantities of carbon and free lime and other impurities. This material has the peculiar property of reacting with the moisture of the air at a rapid rate, releasing practically its entire cyanogen content as gaseous hydrocyanic acid, as set forth in the copending application of Kenneth F. Cooper, Serial No. 717,315, filed June 2, 1924, for fumigating compound and method of fumigating, and assigned to the American Cyanamid Company. Heretofore, in utilizing this material, it was customary to spread the same by hand over the area to be fumigated and allow the action of the atmospheric moisture to evolve the toxic gas, or it was spread by machines on trees or shrubs to be fumigated. In some cases, a measured amount thereof was thrown into the burrows or holes of animals to be destroyed and the heavy moisture content of the air therein released the gas. These procedures have given good results but it is desirable to provide a more convenient means for fumigating with materials of this character, especially for use in enclosed spaces, such as in ships and warehouses, and under tents enclosing trees and shrubs.

It is, therefore, among the objects of my invention to provide an apparatus for liberating toxic gases from a solid material which shall be simple in construction, easy and convenient to operate, and which shall be capable of producing a high concentration of said gases and at a high efficiency.

In practicing my invention I provide a receiver for fumigant and a device, such as a centrifugal blower, which is adapted to force or draw air through the said fumigant, whereby the moisture therein causes the liberation of the toxic gas. Since the humidity of the air varies considerably and often is so low as to act but slowly on the fumigant, I generally provide means for humidifying the air before it reaches the receiver. In order to facilitate the action and to prevent channeling of the fumigant, I prefer to make the receiver of foraminous material and rotate the same while passing air therethrough, thereby exposing a relatively large surface of fumigant to the air.

More specifically my apparatus comprises a horizontal receptacle or tank for water, having a series of cloth-covered baffles therein to provide a tortuous path for the air passing through the same and at the same time increasing the area of wet surface exposed to the air. A blower, attached to the side of said receptacle forces air through the same, raising the humidity thereof, and out through the top thereof into a hollow shaft or sleeve leading to a rotating, gauze-covered cylinder or receiver, which holds the fumigant. The receiver includes an outer member of wire mesh and an inner cage of parallel bars held together by end rings, the said cage being covered by a bag of finely woven fabric. The rotation of the receiver causes the fumigant to be continuously tumbled and showered down in streams, through which the humidified air passes. It is sometimes desirable to heat the incoming air or the water through which it passes in order to prevent any material drop in temperature due to vaporization of the water. The receiver is made readily removable from the remainder of the apparatus, and it is easily taken apart for cleaning or repairs.

In the accompanying drawings constituting a part hereof, and in which like reference characters indicate like parts;

Fig. 2 is a top plan view thereof;

Fig. 3 is a plan view of the water receptacle;

Fig. 4 is a vertical cross-sectional view thereof taken along the line IV—IV of Fig. 3;

Fig. 5 is a similar view taken along the line V—V of Fig. 3, and

Fig. 6 is a detail view of one of the elements.

Figure 1:
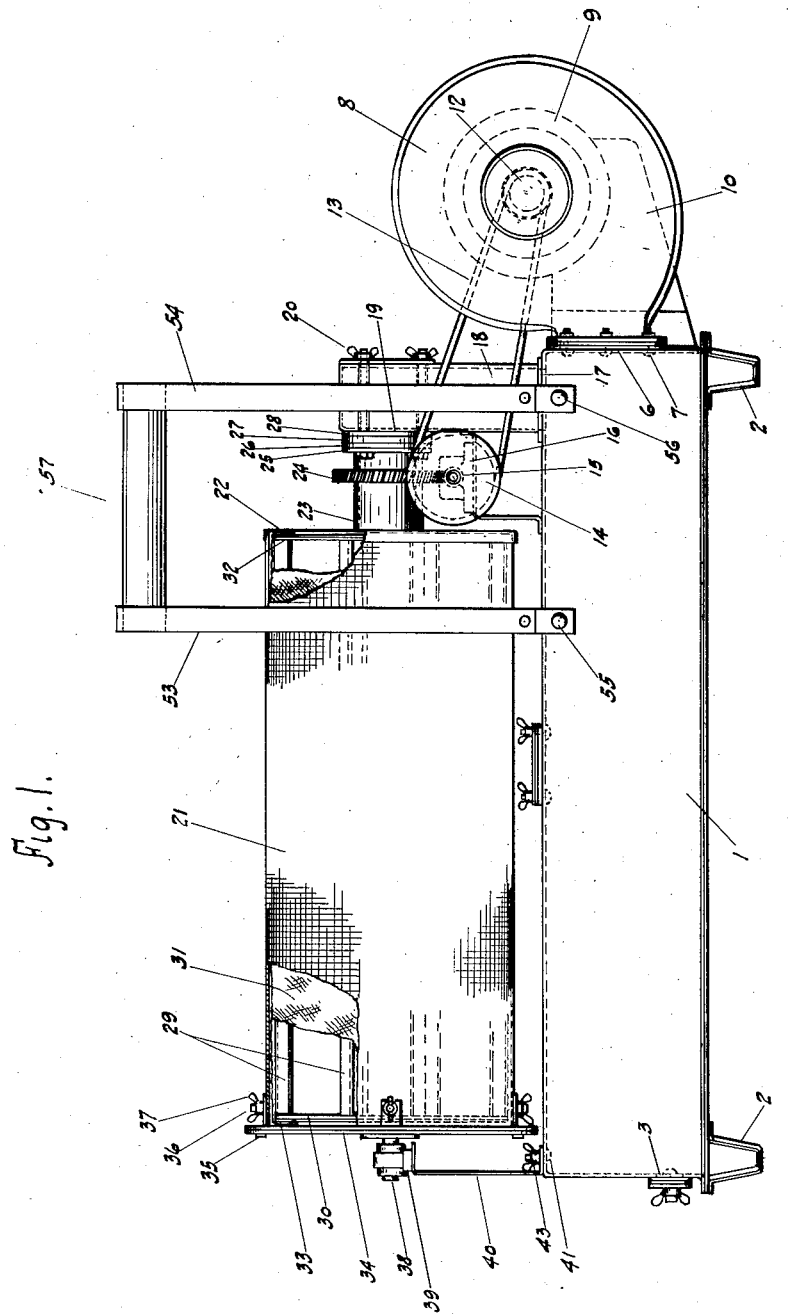
Fig. 1 is a side elevational view of my apparatus, some parts being broken away for clearness.

I provide a receptacle or tank 1, generally rectangular in form, which rests upon legs 2 in each of the corners thereof, and has an opening 3 in the lower portion of one side thereof for draining and cleaning the same. A filling opening 4 in the top is closed by a hinged member 5, which is held in place by suitable bolts and wing nuts.

On one side of the receptacle 1 is an opening 6 having secured thereto by a series of bolts 7, a centrifugal blower 8, coupled with a motor 9, which is supported by a base 10 secured to a bracket 11 on the said receptacle. A pulley 12 on the shaft of motor 9 has a belt 13 passing thereover and over a pulley 14, secured to a worm 15, resting in the bearings 16, secured to the top of the receptacle 1. An opening 17, in the top of the receptacle, is covered by a hollow extension 18 having a lateral opening 19 adapted to be aligned with a sleeve described below. Bolts 20, provided with wing nuts are loosely held in the extension 18 for a purpose to be described.

A cylindrical receiver 21 is provided with an end plate 22, to the central portion of which is secured a hollow shaft or sleeve 23, which has rigidly secured thereto a worm wheel 24. A movable collar 25 having slotted extensions 25′, is fitted loosely on the sleeve 23 and a ring 26 of metal is soldered to the sleeve at a point spaced a slight distance from the free end of the sleeve. A washer 27 of felt or similar material is placed over the end of the sleeve and is adapted to bear against a metal collar 28 rigidly secured to the extension 18.

The receiver 21 includes a cage formed of parallel bars 29 arranged in a circle and secured together by end rings 30. A cylinder 31, consisting of closely woven fabric, is placed thereover and is held securely thereon by means of draw strings 32 and 33 on the respective ends thereof. The cage 29 with its covering 31 is slipped into the cylindrical receiver 21, which is preferably made of wire mesh, and a plate 34, having slotted extensions 35 spaced along the outer edge thereof closes the open end of the said receiver, the slots being adapted to embrace bolts 36 provided with wing nuts 37 for clamping the plate 34 in position. Centrally of plate 34 is a stub shaft 38 resting in bearing 39, secured to a support 40, the base 41 of which is provided with slots 42 adapted to be held in position detachably by bolts and wing nuts 43.

The receptacle 1 has therein a series of vertical baffles 45, 46 and 47 providing a tortuous path therethrough, the baffles 45 and 46 being covered with fabric 48 held in place by lacing through openings 49 along the upper edges of the said baffles. An electrical heating element 50 is placed in the bottom of the receptacle 1 between the baffles and has leads 51 and 52 extending through the top thereof to be connected to any suitable source of electrical energy. Straps 53 and 54 are formed in loops, the ends of which are secured to the sides of the receptacle by rivets or other suitable means 55 and 56, respectively, at about the center of gravity of the apparatus. A handle 57 is secured between the highest points of the said straps.

In the operation of my apparatus, water is placed in the receptacle 1 through opening 4 to a depth of ½ to ¾ of an inch, or say ⅛ of the height thereof. A suitable quantity of cyanogas or other suitable fumigant, having similar characteristics, is placed within the receiver 21 and the whole apparatus is placed in the space to be fumigated. The motor 9 is actuated, causing the blower 8 to force a current of air through the receptacle 1, the air taking up a considerable amount of moisture and passing therefrom into the extension 18. The motor also causes a slow rotation of the receiver 21, which results in the powdered fumigant being tumbled therein and being showered down in streams through the path of the humidified air, which passes through extension 18, through the sleeve 23 into the receiver 21 and uniformly out through the pores thereof. The action of the moisture upon the fumigating compound quickly releases the poisonous constituent thereof as a gas, providing a toxic concentration thereof in the space to be fumigated. After a specified length of time, generally from ½ to 2 hours, the motor is cut off and the gas is allowed to remain in the space for a suitable time, after which the space may be opened and ventilated to remove the fumigant. Because of the fact that the apparatus is placed in the enclosed space to be fumigated, the circulation of the gas by means of the blower 8 causes air to be removed from the space to be fumigated, circulated through the moistening device, through the fumigant into the space and then again through the moistening device, etc.

In order to remove the spent fumigant from the receiver 21, the wing nuts 43 are loosened and the bearing 39 removed from the top of receptacle 1. Wing nuts are loosened and collar 25 rotated slightly so as to release the slotted extensions 25′ and the entire receiver is then removed from the apparatus. Wing nuts 37 are loosened and plate 34 slipped off of the end of the receiver, after which the cage 29 with its covering of fabric 31 is removed and the draw strings 32 and 33 loosened. This allows the covering to be removed from the cage and the spent material thrown away and the covering removed or cleaned, if necessary. In order to provide a fresh charge of fumigant, the parts 29 and 31 are re-inserted into the receiver 21 and a suitable amount of fresh fumigant is placed therein through the opening in the end thereof. Plate 34 is then secured in place and the assembly is replaced on the apparatus in such a manner that the free end of sleeve 23 is inserted into opening 19 of extension 18 and the collar 25 is locked in place by means of the extensions 25′ thereon engaging the bolts and wing nuts 20 which are then tightened to hold the same in position. This also causes the worm wheel 24 to mesh with the worm 15. Bearing 39 is then slipped over the end of shaft 38 and is secured in place by the wing nuts 43. Sufficient water to replace that lost by evaporation is added to the receptacle through opening 4 and the apparatus is then in condition for a further fumigating operation.

From the above description of my invention it will be appreciated that the various parts of the apparatus are arranged so that it may be readily taken apart and the parts easily cleaned or repaired. It is the work of but a few seconds to remove the bearing 39 and cylinder 21, after which the cage 29 may be taken therefrom and its cover 31 taken off and cleaned. All the other moving parts of the apparatus are equally accessible, and the simple, rugged construction thereof insures reliable operation with a minimum of repairs. The apparatus is compact and of light weight, so that it may be carried from place to place by the workman without difficulty. The cost thereof is low because of the simplicity of construction, which also allows a relatively unskilled person to operate the same successfully. The apparatus is capable of accommodating various sizes of charges of the fumigant, giving a wide range of usefulness.

Although I have described a specific embodiment of my invention, giving certain details of construction and operation thereof, my invention is not limited thereto and various changes may be made therein without departing from the principles herein set forth. For instance, the heating element 50 may be omitted entirely or the heat may be obtained by preheating the air. The water receptacle may be of different form, with or without the provision of baffles and a cloth covering therefor, and the air may be bubbled through the water instead of being passed over the surface of the same. Or I may provide a spray or a series of sprays through which the air may pass and thus take up moisture. In place of a blower, I may use any other device which is capable of causing air or other gas to flow through the apparatus at a sufficiently high rate to give the desired action. The means for actuating the blower and the receiver for the fumigant may be separate and independent, or may be of different character than shown. The receiver need not be rotatable, although I prefer to have it so, and it may be placed in other than a horizontal position, whether rotatable or not. The detailed construction thereof may be altered to a considerable extent to suit conditions. The various parts of the apparatus may be assembled in different relative positions and they may be permanently fixed into place, instead of being made detachable.

The fumigant may be in any desired form and I have found that subdivision thereof increases the efficiency of the liberation of toxic gas. I usually utilize the same in the form of flakes, granules or powder, but other sizes and forms thereof may be used in my apparatus. Although in the specification and claims I have specified the use of air, it is to be understood that air is not at all essential to the process as it does not enter into the reaction which takes place to liberate the poisonous gas. It is merely used as a carrier for moisture and is convenient, rendering a special source of supply of gas unnecessary. Other gases, such as nitrogen, flue gases, carbon dioxide, etc., are equally suitable and I include such gases by the term " air "; used in the claims, and where I have mentioned air without stating that it is to be humidified, I rely upon the moisture naturally contained therein. These and other changes may be made in my invention within the scope thereof, which is defined by the claims appended hereto.

What I claim is:

1. An apparatus for fumigating comprising a receiver for fumigant, a receptacle for water and blower means for conducting air through said receptacle and through said receiver successively to cause said fumigant to liberate a poisonous gas.

2. An apparatus for fumigating comprising a receiver for fumigant, a receptacle for water, means therein for increasing the area of contact between the water and air to humidify the same and blower means for conducting air through said receptacle and through said receiver to cause said fumigant to liberate a poisonous gas.

3. An apparatus for fumigating comprising a receiver for fumigant, a receptacle for water, heating means for said water to prevent a substantial drop in temperature thereof due to vaporization and blower means for conducting air through said receptacle and through said receiver to cause said fumigant to liberate a poisonous gas.

4. An apparatus for fumigating comprising a receiver for fumigant, a receptable for water, vertical, cloth-covered baffles therein and blower means for conducting air through said receptacle and through said receiver to cause said fumigant to liberate a poisonous gas.

5. An apparatus for fumigating comprising a foraminous, cloth-covered, rotating receiver for fumigant and blower means for conducting humid air therethrough to cause said fumigant to liberate a poisonous gas.

6. An apparatus for fumigating comprising a receiver for fumigant including a cage and a foraminous covering therefor and blower means for conducting humid air therethrough to cause the same to liberate a poisonous gas.

7. An apparatus for fumigating comprising a receiver for fumigant including a cage, a cloth covering therefor and a foraminous cylinder surrounding the same and blower means for conducting humid air therethrough to cause the same to liberate a poisonous gas.

8. An apparatus for fumigating comprising a receptacle for water, a blower secured thereto for causing air to flow therethrough and a rotary receiver for fumigant supported by said receptacle. said air passing through said receiver.

9. An apparatus for fumigating comprising a receptacle for water, a blower secured thereto for causing air to flow therethrough and a rotary receiver for fumigant supported by said receptacle, said blower causing air from said receptacle to pass through said receiver.

10. An apparatus for fumigating comprising a receptacle for water, a blower secured thereto for causing air to flow therethrough and a rotary receiver for fumigant supported by said receptacle, said blower causing air from said receptacle to pass through said receiver, said receiver being detachable from the apparatus.

11. An apparatus for fumigating comprising a receptacle for water, a blower secured thereto for causing air to flow therethrough and a rotary receiver for fumigant supported by said receptacle, said blower causing air from said receptacle to pass through said receiver, said receiver being detachable from the apparatus without disturbing the connections for producing rotation thereof.

12. An apparatus for fumigating comprising a horizontal receptacle for water, a blower secured to the side thereof, a motor device for driving said blower, and a rotating receiver for fumigant supported by said receptacle, whereby air may be caused to pass through said receptacle and said receiver.

13. An apparatus for fumigating comprising a horizontal receptacle for water, a blower secured to the side thereof, a motor device for driving said blower, a rotating receiver for fumigant supported on said receptacle, whereby air may be caused to pass through said receptacle and said receiver and connections whereby said motor device causes rotation of said receiver.

14. An apparatus for fumigating comprising a horizontal receptacle for water, a blower secured to the side thereof, a motor device for driving said blower, and a rotating receiver for fumigant supported by the top of said receptacle, whereby air may be caused to pass through said receptacle and said receiver.

15. An apparatus for fumigating comprising a horizontal receptacle for water, a blower secured to the side thereof, a motor device for driving said blower, a rotating receiver for fumigant supported by the top of said receptacle, whereby air may be caused to pass through said receptacle and said receiver, a worm secured on said receptacle, a driving connection therefrom to said motor device, and a worm wheel secured to said receiver and meshing with said worm.

16. An apparatus for fumigating comprising a horizontal receptacle for water, a blower secured to the side thereof, a motor device for driving said blower, a rotating receiver for fumigant supported by the top of said receptacle, whereby air may be caused to pass through said receptacle and said receiver, a worm secured on said receptacle, a driving connection therefrom to said motor device, and a worm wheel secured to one end of said receiver and meshing with said worm.

17. An apparatus for fumigating comprising a horizontal receptacle for water, a blower secured to the side thereof, a motor device for driving said blower, a rotating receiver for fumigant supported by the top of said receptacle, whereby air may be caused to pass through said receptacle and said receiver, a worm secured on said receptacle, a driving connection therefrom to said motor device, a worm wheel secured to one end of said receiver and meshing with said worm, and a detachable bearing supporting the other end of said receiver.

18. An apparatus for fumigating comprising a horizontal receptacle for water, a blower secured to the side thereof, a motor device for driving said blower, a rotating receiver for fumigant supported by the top of said receptacle, whereby air may be caused to pass through said receptacle and said receiver, a worm secured on said receptacle, a driving connection therefrom to said motor device, a worm wheel secured to one end of said receiver and meshing with said worm, and a detachable bearing supporting the other end of said receiver, said receiver and worm wheel being detachable from the apparatus.

19. An apparatus for fumigating comprising a horizontal receptacle for water, a blower secured to the side thereof, a motor device for driving said blower, a horizontal rotating receiver for fumigant supported by the top of said receptacle, whereby air may be caused to pass through said receptacle and said receiver, a worm secured on said receptacle, a driving connection therefrom to said motor device, a worm wheel secured to one end of said receiver and meshing with said worm, and a detachable bearing supporting the other end of said receiver, said receiver and worm wheel being detachable from the apparatus.

20. An apparatus for fumigating comprising a horizontal receptacle for water, a blower secured to the side thereof, a motor device for driving said blower, a horizontal rotating receiver for fumigant supported by the top of said receptacle, a worm secured on said receptacle, a driving connection therefrom to said motor device, a worm wheel secured to one end of said receiver and meshing with said worm, said receiver and worm wheel being detachable from the apparatus, said receiver including a cage, a cloth covering therefor and a foraminous cylinder thereover, one end of said cylinder being supported in a bearing, a hollow shaft secured to the other end and connections whereby air passing through said receptacle is caused to flow through said shaft and said receiver.

21. An apparatus for fumigating comprising a horizontal receptacle for water, a blower secured to the side thereof, a motor device for driving said blower, a rotating receiver for fumigant supported on said receptacle, whereby air may be caused to pass through said receptacle and said receiver, a hollow shaft on said receiver and a connection between the same and said receptacle.

22. An apparatus for fumigating comprising a horizontal receptacle for water, a blower secured to the side thereof, a motor device for driving said blower, a rotating receiver for fumigant supported on said receptacle, whereby air may be caused to pass through said receptacle and said receiver, a hollow shaft on said receiver, a connection between the same and said receptacle and a handle secured to one side of said apparatus.

23. The method of fumigating, which comprises subjecting a solid cyanide-containing material to the action of a moist gaseous medium capable of causing evolution by hydrocyanic acid from the solid material, delivering the gaseous medium containing the hydrocyanic acid to the space to be fumigated and returning the gaseous medium for further contact with the solid material.

24. The method of fumigating, which comprises subjecting a solid cyanide-containing material to the action of a moist gaseous medium capable of causing evolution of hydrocyanic acid from the solid material and delivering the gaseous medium containing the hydrocyanic acid to the space to be fumigated.

25. The method of fumigating, which comprises subjecting a solid cyanide-containing material to the action of a moist gaseous medium capable of causing evolution of hydrocyanic acid from the solid material, delivering the gaseous medium containing the hydrocyanic acid to the space to be fumigated, withdrawing the gaseous medium from the space to be fumigated, adding moisture thereto and returning it for further contact with the solid material.

26. The method of fumigating, which comprises subjecting a solid material containing calcium cyanide to the action of moistened air and delivering the air containing hydrocyanic acid produced by decomposition of the calcium cyanide to the space to be fumigated.

27. The method of fumigating, which comprises subjecting a solid material containing calcium cyanide to the action of moist air, delivering the air containing hydrocyanic acid produced by decomposition of the calcium cyanide to the space to be fumigated, withdrawing and moistening the air and returning it for further contact with the solid material.

28. The method of fumigating, which comprises circulating a moist gaseous medium between a space to be fumigated and a body of solid cyanide-containing material capable of decomposing upon contact with the gaseous medium to produce hydrocyanic acid.

29. The method of fumigating, which comprises circulating a moist gaseous medium between a space to be fumigated and a body of solid cyanide-containing material capable of decomposing upon contact with the gaseous medium to produce hydrocyanic acid and moistening the gaseous medium before contact thereof with the solid material.

30. The method of fumigating, which comprises passing a moist gaseous medium through a body of solid cyanide-containing material capable of decomposing in the presence of the gaseous medium to produce hydrocyanic acid and delivering the gaseous medium containing the hydrocyanic acid to the space to be fumigated.

31. The method of fumigating, which comprises passing a moist gaseous medium through a body of solid cyanide-containing material capable of decomposing in the presence of the gaseous medium to produce hydrocyanic acid, delivering the gaseous medium containing the hydrocyanic acid to the space to be fumigated, withdrawing the gaseous medium from the space to be fumigated and returning it for further contact with the solid material.

32. The method of fumigating, which comprises passing a moist gaseous medium through a body of solid cyanide-containing material capable of decomposing in the presence of the gaseous medium to produce hydrocyanic acid, delivering the gaseous medium containing the hydrocyanic acid to the space to be fumigated, withdrawing the gaseous medium from the space to be fumigated, adding moisture thereto and returning it for further contact with the solid material.

33. The method of fumigating, which comprises passing moist air through a body of soil material containing calcium cyanide and delivering the air containing hydrocyanic acid produced by decomposition of the cyanide to the space to be fumigated.

34. The method of fumigating, which comprises passing moist air through a body of solid material containing calcium cyanide, delivering the air containing hydrocyanic acid produced by decomposition of the cyanide to the space to be fumigated, withdrawing the air from the space to be fumigated and returning it for further contact with the solid material.

35. The method of fumigating, which comprises passing moist air through a body of solid material containing calcium cyanide, delivering the air containing hydrocyanic acid produced by decomposition of the cyanide to the space to be fumigated, withdrawing and moistening the air and returning it for further contact with the solid material.

36. In an apparatus for fumigating, a chamber, means therein to permit the passage of a gaseous medium and to retain solid particles, means for delivering a gaseous medium thereto, an enclosure for the space to be fumigated, means for delivering the gaseous medium to the enclosure and means for returning the gaseous medium to the chamber.

37. In an apparatus for fumigating, a chamber, means therein to permit the passage of a gaseous medium and to retain solid particles, means for delivering a gaseous medium thereto, an enclosure for the space to be fumigated, means for delivering the gaseous medium to the enclosure and means for returning the gaseous medium to the chamber, including means for maintaining circulation of the gaseous medium.

38. In an apparatus for fumigating, a chamber, means therein to permit the passage of a gaseous medium and to retain solid particles, means for delivering a gaseous medium thereto, an enclosure for the space to be fumigated, means for delivering the gaseous medium to the enclosure, and means for returning the gaseous medium to the chamber, including means for maintaining circulation of the gaseous medium and means for moistening the gaseous medium.

In testimony whereof, I have hereunto subscribed my name this sixth day of July, 1925.

KENNETH A. KILBOURNE.

CERTIFICATE OF CORRECTION.

Patent No. 1,900,717.  March 7, 1933.

KENNETH A. KILBOURNE.

It is hereby certified that error appears in the printed specification of the above numbered patent requiring correction as follows: Page 2, line 122, after "nuts" insert the number "20"; page 6, line 21, claim 33, for "soil" read "solid"; and that the said Letters Patent should be read with these corrections therein that the same may conform to the record of the case in the Patent Office.

Signed and sealed this 16th day of May, A. D. 1933.

M. J. Moore.

Acting Commissioner of Patents.

(Seal)